3,255,141
ORGANOPOLYSILOXANES HEAT-SENSITISING AGENTS

Klaus Damm, Cologne-Flittard, Heinz Hornig, Cologne, Gustav Sinn, Bergisch-Neukirchen, and Hans-Horst Steinbach, Leverkusen, Germany, assignors to Farbenfabriken Bayer Aktiengesellschaft, Leverkusen, Germany, a German corporation
No Drawing. Filed July 1, 1963, Ser. No. 292,162
Claims priority, application Germany, July 6, 1962, F 37,251
3 Claims. (Cl. 260—29.6)

This invention relates to the heat-sensitisation of polymers and to compounds which can be used therefor.

It is known that thick-walled dipped articles can be produced by dipping hot molds or formers into heat-sensitised mixtures of natural latex or synthetic latex. The heat-sensitive latex mixture coagulate into a closed film when heated to a predetermined temperature, which depends upon the nature of the heat-sensitiser.

Synthetic latices, more especially with those which comprise copolymers of butadiene and acrylonitrile, butadiene, acrylonitrile and styrene and polychloroprene are especially difficult to heat-sensitise. Such latices can only be heat sensitised by adding relatively large quantities of the known sensitisers. Furthermore, the film produced on the hot former is very often too thin.

It is an object of the present invention to provide new heat-sensitising agents. Another object is to provide heat-sensitising agents which are especially suitable as heat sensitisers for latices of synthetic polymers especially polymers and copolymers of butadiene, acrylonitrile, styrene and chloroprene. Further objects will appear hereinafter.

It has now been found that organopolysiloxanes which are particularly suitable as heat-sensitising agents are those which contain on 2 units of the compounds (a) $(R_1)_n SiO_{4-n/2}$ 1 to 20 units of the compounds (b) $(R_1)_m Si[-R_2-X]O_{4-m-1/2}$ and which contain up to at most 100 of such units. In these compounds X represents a radical of the formula

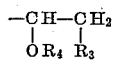

$R_1$ represents hydrogen, alkyl, preferably lower alkyl, or aryl, preferably phenyl groups,
$R_2$ represents an alkylene radical, preferably lower alkylene radical that may, if desired contain oxygen,
$R_3$ represents a polyether radical, preferably a lower alkyl ether,
$R_4$ represents $R_1$ or an acyl radical, preferably of a lower aliphatic carboxylic acid,
$m$ is 1 or 2 and
$n$ is 1, 2 or 3.

The polyether radicals corresponds preferably to the formulae $(-C-C-O-)_z$ or

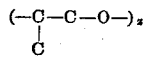

wherein $z$ is such a number that the polyether contains preferably 10 to 100 of such units. Furthermore those polyethers are preferred which consist mainly of units of the first formula but which can contain also, e.g., up to 60% of units of the second formula.

The compounds used according to the invention can, for example, be obtained by reacting the corresponding compounds, in which X stands for an ethylene oxide radical, with polyethers which contain at least one hydroxyl group bonded to carbon. The hydroxyl group is reacted, in known manner, with the ethylene oxide group. If $R_4$ stands for a hydrogen atom, the hydroxyl group thereby formed can thereafter be etherified or esterified. It is advantageous to introduce such quantities of the polyether that at least one mol of OH groups are present to 1 mol of the ethylene oxide groups. It is frequently advantageous to introduce the polyethers in such quantities that the hydroxyl groups are present in an excess of up to 50%, relative to the ethylene oxide groups. Under such conditions, mixtures of the polyethers and the organopolysiloxanes used according to the invention are obtained.

The organopolysiloxanes containing ethylene oxide groups can be prepared by processes which are known per se. For example, this can be achieved by reacting organopolysiloxanes which contain alkenyl groups, e.g., allyl groups, with peroxides so that the alkenyl group is oxidised to form an epoxy group. Another way to produce the organopolysiloxanes is to add epoxides containing a C=C double bond, to the SiH groups of organopolysiloxanes. Butadiene monoxide or allyl glycide ether can, for example, be used for this. This addition can be catalysed by platinum.

The polyethers used to produce the compounds employed according to the invention can, for example, have molecular weights from 100 up to several millions, e.g., 2 to 3 mililons. These polyethers can be obtained in known manner, e.g. by polymerization or co-polymerization of alkylene oxides, for example, propylene oxide, ethylene oxide, 1,2-epoxybutane or isobutylene oxide. It is preferred to use polymers of propylene oxide or copolymers of propylene oxide and ethylene oxide, which may also contain other alkylene oxides, for example, 1,2-epoxybutane, isobutylene oxide, tetrahydrofuran or styrene oxide. To form such copolymers, propylene oxide and ethylene oxide are advantageously used in the molar ratio 1:1.

The organopolysiloxanes used according to the invention may be either soluble or insoluble in water. Compounds which are soluble in water at room temperature are, however, preferably used.

Apart from natural latex, the latices of synthetic rubber-like polymers can also be employed, such as those obtained from conjugated diolefins, for example, butadiene, dimethyl butadiene, isoprene and their homologues and copolymers of such conjugated diolefins with such polymerizable vinyl compounds as styrene, α-methylstyrene and their substitution products, acrylonitrile, methacrylonitrile and similar polymers or copolymers which are obtained from isoolefins, such as isobutylene and its homologues, possibly with small quantities of conjugated diolefins. Also suitable are latices of those polymers which are obtained from chlorobutadiene and its copolymers with monoolefins and/or diolefins or polymerizable vinyl compounds and, in addition, polymers which are obtained from vinyl chloride or from acrylic acid esters. Aqueous dispersions of siloprene rubber can also be used. These latices can also contain the usual additives, for example fillers.

The quantity to be added of the organopolysiloxanes suitable as sensitisers is, generally, 0.01 to 1.0, preferably 0.05 to 0.5% by weight, calculated on the solids content of the latex. Using these mixtures, it is possible, by known processes, to produce dipped articles and to extrude rubber filaments by allowing the mixture to flow through externally heated capillaries.

Example 1

100.0 parts by weight of dry natural rubber=167.0 parts by weight of 60% natural latex
1.0 part by weight of organopolysiloxane A
4.0 parts by weight of 20% emulsifier
2.5 parts by weight of zinc oxide ⎫
2.5 parts by weight of sulfur ⎬ *
0.8 part by weight of zinc dimethyldithiocarbamate ⎭
3.0 to 6.0 parts by weight of 30% formaldehyde
Coagulation point: about 42° C.

*Dispersed in 12.2 parts by weight of a 5% aqueous solution of a condensation product of sodium naphthalene sulfonate with formaldehyde.

*Preparation of the organopolysiloxane A.*—100 parts of trimethyl monochlorosilane (($CH_3$)$_3$SiCl) are mixed with 160 parts of methyl-hydrogen dichlorosliane (($CH_3$)$HSiCl_2$)

and hydrolysed in water to give an oil of the composition $2(CH_3)_3SiO_{1/2} \cdot 3(CH_3)HSiO$ 100 parts of this oil are reacted with 147 parts of allyl glycide ether at 150° C., using, as catalyst, 1 part of $Al_2O_3$ onto which 2% of Pt have been precipitated. The reaction product is an oil of the composition

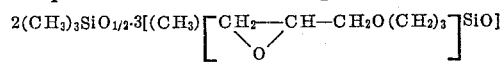

100 parts of this oil are heated for 1 hour at 100° C. with 700 parts of a polyether, which is a copolymer of equal parts by weight of polyethylene and polypropylene oxides, which contains 1.1% by weight of OH and to which 0.37 g. of $BF_3$ dissolved in 0.39 g. of tetrahydrofuran had been added. The quantity of the polyether is so calculated that there is an excess of about 10% by weight, compared with the equivalent ratio of 1 mol of epoxy groups to 1 mol of OH groups of the polyether. The reaction product contains a compound of the formula

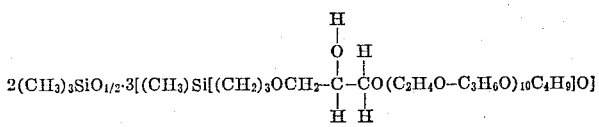

The epoxy organopolysiloxane oil can be reacted in equal manner with other polyalkylene oxides. The reaction conditions in respect of time and temperature are unchanged. The composition of the polyethers and the quantities to be reacted in each case with 100 parts of the epoxy organopolysiloxane are given in the following table:

| Composition of the polyether | Quantitative proportion per 100 parts of polyether |
| --- | --- |
| $A_1$. H(OC$_2$H$_4$)$_{30}$(OC$_3$H$_6$)$_{20}$OC$_4$H$_9$ | 1,150 parts. |
| $A_2$. H(OC$_2$H$_4$)$_{60}$(OC$_3$H$_6$)$_{20}$OC$_4$H$_9$ | 1,700 parts. |

When incorporating the polyethers $A_1$ and $A_2$ into the latex mixture defined in Example 1, instead of organopolysiloxane A, a coagulation point of 43° C. is obtained in either case.

The same result is attained if, prior to the incorporation into the latex, the polyethers A, $A_1$ and $A_2$ are subjected according to Example 1 in the amount indicated for the polyether A to an esterification or etherification reaction. This process can be accomplished in usual manner by the reaction with acetic anhydride, dimethylsulfate or benzyl chloride. In this process there are reacted the secondary OH groups (—CHOH—) formed in the reaction of the epoxyde groups with the OH groups of the polyethers.

*Etherification with dimethyl sulfate.*—100 parts of the organopolysiloxane A are reacted with an excess of 7.5 parts of dimethyl sulfate and 3.5 parts of pulverulent KOH and heated to 135° C. for about 3 hours. After filtration the oil is finally heated in vacuum at 150° C. to remove unreacted dimethyl sulfate.

The above described reaction can be accomplished with the oils $A_1$ and $A_2$. Since the OH contents are substantially distinct from one another and the reaction is preferably conducted with an excess quantity of dimethyl sulfate, the above said quantitative proportions can be applied.

*Esterification with acetic anhydride.*—100 parts each of the oils A, $A_1$ and $A_2$ are heated at 150° C. for 3 hours while stirring with an excess of 10 parts of acetic anhydride. The resulting acetic acid and the excess of acetic anhydride are finally heated at 150° C. and 20 mm. vacuum.

*Etherification with benzyl chloride.*—100 parts each of the oils A, $A_1$ and $A_2$ are heated at 170° C. for 3 hours with an excess of 7.5 parts of benzyl chloride and thereafter finally heated at this temperature and 10 mm. vacuum.

Example 2

100.0 parts by weight of dry 2-chlorobutadiene-methacrylic acid copolymer=200.0 parts by weight of 50% 2-chlorobutadiene-methacrylic acid copolymer latex
2.0 parts by weight of organopolysiloxane B
1.0 part by weight of non-ionic stabilizer, 20% in water
10.0 parts by weight of kaolin ⎫
7.5 parts by weight of zinc oxide ⎪
3.0 parts by weight of titanium dioxide ⎬ *
1.0 part by weight of sulfur ⎪
1.5 parts by weight of zinc dimethyldithiocarbamate ⎭
Coagulation point: about 45° C.

*Dispersed in 31.5 parts by weight of a 5% aqueous solution of a condensation product of sodium methylene-bis-naphthalene sulfonate.

*Preparation of the organopolysiloxane B.*—From a mixture of monomethyl dichlorosilane and trimethyl monochlorosilane in the ratio by weight of 94:6, there is hydrolytically recovered a siloxane oil with a viscosity from 20 to 30 cst. (20° C.). This oil is reacted with allyl glycide ether in the ratio by weight of 100:66, i.e., in the molar ratio SiH:ether of 2:1, by mixing the siloxane oil with 2 g. of $Al_2O_3$-Pt catalyst described in Example 1 and by adding the calculated quantity of allyl glycide ether, dropwise at 150° C. The reaction temperature is kept at 150° C. ±2° C. by cooling. There is thus obtained an epoxide oil, of which the chains comprise 2 units of the formula ($CH_3$)$_3$SiO$_{1/2}$, approximately 20 units of the formula ($CH_3$)HSiO and approximately 20 units of the formula

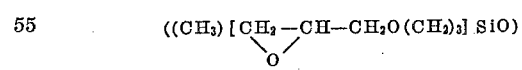

and which contains about 19.3% by weight of epoxide groups (molecular weight 42).

100 parts of this oil are heated for 1 hour at 100° C. with 710 parts of the polyether of Example 1, to which had been added 0.37 part of $BF_3$ dissolved in 39 parts of tetrahydrofuran. The compound obtained can be represented by the following formula

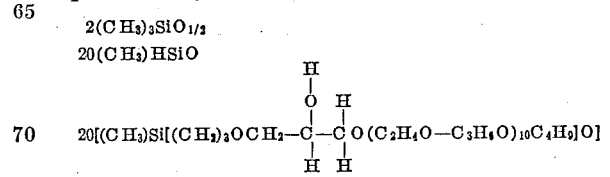

An organopolysiloxane which is equally suitable is obtained by hydrolysing 97.9 parts of monomethyl dichlorosilane and 2.1 parts of trimethyl chlorosilane. The oil approximately corresponds to the composition:

$$2(CH_3)_3SiO_{1/2} \cdot 90(CH_3)HSiO$$

This oil is reacted with allyl glycide ether in the above described manner in a molecular ratio SiH:ether of 2:1. There is obtained an epoxide oil of the composition:

2(CH₃)₃SiO₁/₂·45(CH₃HSiO·45(CH₃)(CH₂—CH—CH₂—O—(CH₂)₃)SiO
\_O_/

100 parts of this oil are mixed with 750 parts of polyether of organopolysiloxane A with 1.1% by weight of OH and 0.4 g. of BF₃, dissolved in 0.4 g. of tetrahydrofuran, and heated to 120° C. The reaction is complete after one hour. The organopolysiloxane B₁ is obtained.

A latex according to Example 3, which contains the organopolysiloxane B₁ instead of B, has a coagulation point of 45° C.

Example 3

50.00 parts by weight of dry butadiene-acrylonitrile-methacrylic acid copolymer=105.00 parts by weight of 47.5% butadiene-acrylonitrile-methacrylic acid copolymer latex
50.00 parts by weight of dry acrylonitrile-butadiene copolymer=111.00 parts by weight of 45% acrylonitrile-butadiene copolymer latex
0.26 part by weight of organopolysiloxane B
10.00 parts by weight of non-ionic stabilizer, 20% in water.
1.00 part by weight of sulfur ⎫
2.50 parts by weight of zinc oxide ⎬ *
0.80 part by weight of zinc dimethyldithiocarbamate ⎭

*Dispersed in 6.7 parts by weight of a 5% solution of a condensation product of sodium methylene-bis-naphthalene sulfonate.

Coagulation point: about 41° C.

Example 4

100.00 parts by weight of dry butyl acrylate methylol ether copolymer=250.00 parts by weight of 40% butyl acrylate ether copolymer latex
3.00 parts by weight of organosiloxane B
6.00 parts by weight of water
Coagulation point: about 45° C.

Example 5

100.0 parts by weight of dry butadiene-styrene copolymer=167.0 parts by weight of 60% butadiene-styrene copolymer latex
4.0 parts by weight of organosiloxane B
4.0 parts by weight of non-ionic stabilizer
4.0 parts by weight of water
1.0 part by weight of sulfur ⎫
2.5 parts by weight of zinc oxide ⎬ *
0.8 part by weight of zinc dimethyldithiocarbamate ⎭

*Dispersed in 6.7 parts by weight of a 5% solution of a condensation product of sodium methylene-bis-naphthalene sulfonate.

Coagulation point: about 45° C.

Example 6

100.0 parts by weight of solid polyvinyl chloride=167.0 parts by weight of 60% polyvinyl chloride dispersion
1.0 part by weight of organosiloxane B
2.0 parts by weight of water
Coagulation point: about 42° C.

Example 7

100.0 parts by weight of solid organopolysiloxane=250.0 parts by weight of 40% organopolysiloxane emulsion
2.0 parts by weight of organosiloxane B
4.0 parts by weight of water
Coagulation point: about 42° C.

*Organopolysiloxane C.*—A siloxane oil of the composition $$2(CH_3)_3SiO_{1/2} \cdot 20(CH_3)_2SiO \cdot 20(CH_3)HSiO$$

is obtained by hydrolysis from a mixture of 22 parts of trimethyl monochlorosilane, 258 parts of dimethyl dichloro silane and 230 parts of methyl-hydrogen dichlorosilane. 100 parts of this oil are mixed according to Example 1 with 0.5 part of an Al₂O₃-Pt catalyst and heated at 154° C. with 260 parts of allyl glycide ether. The reaction is complete after 20 minutes. An epoxide oil of the composition:

2(CH₃)₃SiO₁/₂·20(CH₃)₂SiO·20(CH₃)(CH₂—CH—CH₂—O—(CH₂)₃)SiO
\_O_/ is obtained.

100 parts of this oil are mixed with 700 parts of the polyethylene-polypropylene-copolymer of the organopolysiloxane A containing 1.1% by weight of OH and 0.4 g. of BF₃, dissolved in 0.4 g. of tetrahydrofuran, is added. The reaction is complete after heating at 120° C. for 1 hour. The organopolysiloxane C is thus obtained. If the organopolysiloxane C is used in the latex according to Example 3 instead of the organopolysiloxane B, a coagulation point of 50° C. is obtained.

The same result is obtained if 100 parts of the organopolysiloxane C are reacted with 10 parts of dimethyl sulfate at 135° C. for 3 hours to methylate the hydroxy groups. After completion of the reaction final heating is effected by heating at 150° C. and 20 mm. vacuum.

*Organopolysiloxane D.*—A siloxane oil of the composition $$C_6H_5SiO_{3/2} \cdot 3[3 \cdot (CH_3)_2SiO \cdot 3(CH_3)HSiO \cdot (CH_3)_3SiO_{1/2}]$$

is hydrolytically obtained from a mixture of 21 parts of phenyltrichlorosilane, 77 parts of dimethyl dichlorosilane, 69 parts of methyl-hydrogen dichlorosilane and 32 parts of trimethyl monochlorosilane. 100 parts of this oil are mixed according to Example 1 with 0.5 part of an Al₂O₃-Pt catalyst and 135 parts of allyl glycide ether and heated to 154° C. The reaction is complete after 20 minutes. An epoxide oil of the composition:

C₆H₅SiO₃/₂·3[3(CH₃)₂SiO·3(CH₃)(CH₂—CH—CH₂—O—(CH₂)₃SiO·(CH₃)₃)SiO₁/₂
\_O_/ is obtained.

100 parts of this oil are mixed with 450 parts of polyether of the organopolysiloxane A containing 1.1% by weight of OH and 0.3 g. of BF₃, in 0.3 g. of tetrahydrofuran, and heated to 150° C. for 2 hours. The organopolysiloxane D is thus obtained.

If the organopolysiloxane D is used in the latex according to Example 3 instead of the organopolysiloxane B, a coagulation point of 50° C. is obtained.

*Organopolysiloxane E.*—1 g. of an aluminum oxide charged with 2% by weight of Pt and 82 g. of butadiene monoxide are added in an autoclave to 100 g. of a siloxane oil prepared by hydrolysis of 96 parts of monomethyl dichlorosilane and 4 parts of trimethyl chlorosilane and the mixture is heated to 150° C. An oil of the composition 2(CH₃)₃SiO₁/₂·10(CH₃)HSiO·30(CH₃)(CH₂—CH—CH₂—O—(CH₂)₃)SiO
\_O_/ is obtained.

100 parts of this oil are mixed with 2600 parts of the polyether of the organopolysiloxane A and 0.5 part of KOH and heated to 100° C. for 2 hours. The organopolysiloxane E is thus obtained.

If 2 parts of the organopolysiloxane E are used in the latex of Example 1 instead of 1 part of the organopolysiloxane A, a coagulation point of 45° C. is obtained.

We claim:
1. In the process of heat sensitising polymer latices the improvement which comprises incorporating into the latices selected from the group consisting of natural rubber latex and homopolymers and copolymers of butadiene, dimethyl butadiene, isoprene, styrene, alpha-methyl styrene, acrylonitrile, methacrylonitrile, isobutylene, chlorobutadiene, vinylchloride and acrylic acid esters as heat sensitiser organopolysiloxanes which contain on 2 units of the compounds

(a) $(R_1)_n SiO_{4-n/2}$ 1 to 20 units of the compounds (b) $(R_1)_m Si[-R_2-X]O_{4-m-1/2}$ wherein X represents a radical of the formula

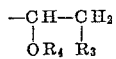

$R_1$ represents at least one member selected from the group consisting of hydrogen, lower alkyl and phenyl groups,
$R_2$ represents at least one member selected from the group consisting of lower alkylene radicals and lower alkylene radicals containing oxygen,
$R_3$ represents a polyether radical,
$R_4$ represents at least one member selected from the group consisting of hydrogen, lower alkyl, phenyl and lower aliphatic carboxylic acid radicals,
$m$ represents 1 or 2,
$n$ represents 1, 2 or 3.

2. Process as claimed in claim 1 which comprises using as heat sensitising agent a compound of the formula

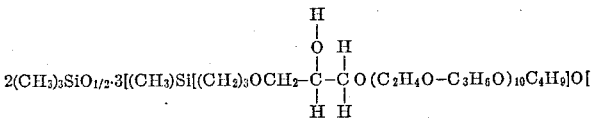

3. Process as claimed in claim 1 which comprises using as heat sensitising agent a compound of the formula

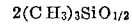
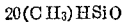

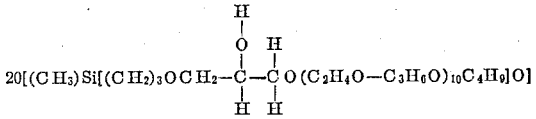

References Cited by the Examiner

UNITED STATES PATENTS

| | | | |
|---|---|---|---|
| 2,984,631 | 5/1961 | Talalay et al. | 260—2.5 |
| 3,057,901 | 10/1962 | Plueddemann | 260—448.2 |

SAMUEL H. BLECH, *Primary Examiner.*

MURRAY TILLMAN, *Examiner.*

J. ZIEGLER, *Assistant Examiner.*